US010110369B2

(12) United States Patent
Grice et al.

(10) Patent No.: US 10,110,369 B2
(45) Date of Patent: Oct. 23, 2018

(54) QUANTUM-AUTHENTICATED CLOCK SIGNAL

(71) Applicant: UT-Battelle, LLC, Oak Ridge, TN (US)

(72) Inventors: Warren P. Grice, Oak Ridge, TN (US); Raphael C. Pooser, Knoxville, TN (US); Phani Teja Kuruganti, Knoxville, TN (US); Philip G. Evans, Konxville, TN (US); Miljko Bobrek, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 29 days.

(21) Appl. No.: 15/583,502

(22) Filed: May 1, 2017

(65) Prior Publication Data
US 2017/0317814 A1    Nov. 2, 2017

Related U.S. Application Data

(60) Provisional application No. 62/330,480, filed on May 2, 2016.

(51) Int. Cl.
*H04B 10/70*   (2013.01)
*H04L 7/00*    (2006.01)
(Continued)

(52) U.S. Cl.
CPC .............. *H04L 7/0075* (2013.01); *G06F 1/12* (2013.01); *H04B 10/70* (2013.01); *H04L 9/0852* (2013.01);
(Continued)

(58) Field of Classification Search
CPC . H04L 7/0075; H04L 9/0852; H04L 63/1408; H04L 7/0008; G06F 1/12;
(Continued)

(56) References Cited

U.S. PATENT DOCUMENTS

| 6,438,234 B1 | 8/2002 | Gisin et al. |
| 2007/0009098 A1 * | 1/2007 | Tanaka ..................... H04L 1/242 380/30 |

(Continued)

OTHER PUBLICATIONS

Fletcher, J.G. et al., "Smart Clocks Have a Hand in the Smart Grid", 2011 IEEE Power and Energy Society General Meeting, San Diego, CA, Jul. 24-29, 2011.

(Continued)

*Primary Examiner* — Ted Wang
(74) *Attorney, Agent, or Firm* — Warner Norcross + Judd LLP

(57) ABSTRACT

The present disclosure is directed to a system and method of distributing time information to enable synchronization in an authenticated manner via a quantum channel. A source device may transmit a timing signal, T on a communication channel from the source device to a receiver device. The timing signal T may be include a time or times stored in memory or calculated using a previously agreed upon formula. The method may include transmitting a quantum system Q from the source device to the receiver device. The quantum system may be prepared in a randomly chosen state and may be measured by the receiver device in a randomly chosen measurement basis.

20 Claims, 3 Drawing Sheets

(51) Int. Cl.
*H04L 29/06* (2006.01)
*G06F 1/12* (2006.01)
*H04L 9/08* (2006.01)

(52) U.S. Cl.
CPC ........ *H04L 63/1408* (2013.01); *H04L 63/061* (2013.01); *H04L 63/1475* (2013.01)

(58) Field of Classification Search
CPC ....... H04B 10/70; H04B 10/299; H04J 14/02; H04J 14/08
See application file for complete search history.

(56) References Cited

U.S. PATENT DOCUMENTS

| | | | | |
|---|---|---|---|---|
| 2009/0194702 | A1* | 8/2009 | Meyers | H04L 9/0858 250/393 |
| 2009/0316910 | A1* | 12/2009 | Maeda | H04L 9/0855 380/279 |

OTHER PUBLICATIONS

North American Electric Reliability Corporation, "Real-Time Application of Synchrophasors for Improving Reliability", NERC, Oct. 18, 2010, pp. 1-77.

Hambling, D., "GPS chaos: How a $30 box can jam your life", NewScientist, Issue 2803, published Mar. 12, 2011.

Akkaya, I. et al., "Model-Based Evaluation of GPS Spoofing Attacks on Power Grid Sensors", presented at BEARS 2013, University of California at Berkeley, Feb. 2013.

Symmetricom SyncServer SGC-1500 Data Sheet, www.symmetricom.com, 2012, pp. 1-2.

Stucki, D. et al., "Quantum key distribution over 67 km with a plug&play system", New Journal of Physics, vol. 4, Mar. 2002, pp. 41.1-41.8.

Tippenhauer, N.O. et al., "On the Requirements for Successful GPS Spoofing Attacks", Proceedings of the 18th ACM Conference on Computer and Communications Security, ACM, New York, 2011, pp. 1-12.

O'Hanlon, B.W. et al., "Real-Time GPS Spoofing Detection via Correlation of Encrypted Signals", Navigation, vol. 60, 2013, pp. 1-20.

Bennett, C.H. et al., "Quantum cryptography: Public-key distribution and coin tossing", Theoretical Computer Science, vol. 560, Part 1, Dec. 4, 2014, pp. 7-11.

Shepard, D.P. et al., "Evaluation of the Vulnerability of Phasor Measurement Units to GPS Spoofing Attacks", Sixth Annual IFIP WG 11.10 Conference on Critical Infrastructure Protection, Washington D.C., Mar. 19-21, 2012, pp. 1-10.

ID Quantique Data Sheet, "Clavis2 The Most Versatile Quantum Key Distribution Research Platform", dated Jul. 2014, available at www.idquantique.com.

* cited by examiner

QUANTUM-AUTHENTICATED CLOCK SIGNAL

CROSS-REFERENCE TO RELATED APPLICATIONS

This application claims the benefit of U.S. Provisional Application No. 62/330,480, filed May 2, 2016, the disclosure of which is hereby incorporated by reference in its entirety.

STATEMENT REGARDING FEDERALLY SPONSORED RESEARCH AND DEVELOPMENT this invention was made with government support under Contract No. DE-AC05-00OR22725 awarded by the U.S. Department of Energy. The government has certain rights in the invention.

TECHNICAL FIELD

The present application relates to distribution of timing information between two or more devices, and more particularly toward the timing information being quantum authenticated.

BACKGROUND

Many government, industrial, and military systems include devices that are synchronized at different locations. In the absence of clocks that can be transported while remaining exceptionally stable and reliable, synchronization utilizes some sort of timing signal to be transmitted from one location to another. Such signal can be transmitted via a communication channel (e.g., radio, microwave, internet). As long as the time of flight is known, the receiver can synchronize its clock with the sender's clock to within technical uncertainties. In the context of a Global Positioning System (GPS), GPS based timing schemes are based on the concept of synchronization of clocks. GPS receivers obtain signals from multiple satellites and calculate position and time based on the time difference between the signals. Schemes such as GPS are considered vulnerable to: spoofing, in which an adversary replaces a valid timing signal with its own; and interference, in which an adversary provides multiple timing signals, leaving the receiver unable to identify the correct signal. Conventionally encrypted timing signals can mitigate some of these vulnerabilities, but are in many cases impractical to implement.

Conventional infrastructure and associated devices, such as a conventional grid power sub-station, have become increasingly dependent on microprocessor and programmable logic-based monitoring and control systems. Many of these types of conventional infrastructure devices utilize precision timing sources for synchronization of various functions.

For instance, in the context of an electric grid, precision timing may be used across power generation, transmission, and distribution domains. The distribution of timing information across the electric grid is conventionally accomplished primarily through the global positioning system (GPS). The GPS system provides timing information with a resolution, precision, and accuracy utilized by the electric grid to coordinate efforts across domains of a large geographic scale. For instance, timing information may be synchronized for two devices that are 100 kilometers or more apart.

Reliance on the GPS system, however, is not without downsides. The GPS system is generally outside the control of the electric grid or other devices utilizing the system. Further, the GPS system has been shown to be vulnerable to spoofing attacks. The lack of control or the spoofing possibility, or both, mean that reliance on the GPS system can cause adverse effects on operation. In some cases, the timing information may be critical to operation, meaning adverse effects due to spoofing or receipt of signals from the GPS system may cause fault conditions.

Conventional efforts have been made to reduce reliance on the GPS system for timing information. In the case of the electric grid, precision timing protocol (PTP) has been utilized to synchronize clocks of devices on the electric grid. However, conventional PTP, as well as other conventional efforts to reduce reliance on the GPS system, can be susceptible to security and integrity compromises. For this reason, many aspects of the electric grid and devices in other realms utilize the GPS system for timing information despite the lack of control and the spoofing possibility.

With the potential security issues with the conventional time reference and distribution system for the electric grid, the electric grid can be vulnerable to black outs and damage to critical infrastructure. For instance, electrical distribution systems servicing a high density of customers in urban and suburban areas with load densities that can exceed 60 MW and 3 MW per square mile, respectively, can cause significant losses if taken down unexpectedly. Urban distribution centers may comprise sub-stations servicing high loads and separated by distances of several tens of miles or less. Many of these centers are capable of automatic shedding of 300 MW or more. The North American Electric Reliability Council (NERC) considers these assets to be critical because improper shedding of a large amount of power in such a system can damage the electrical power grid.

SUMMARY OF THE DESCRIPTION

The present disclosure is directed to a system and method of distributing time information to enable synchronization in an authenticated manner via a quantum channel. The method may include two primary steps. First, a source device may transmit a timing signal, T on a communication channel from the source device to the receiver device. The timing signal T may include a time or times stored in memory or calculated using a previously agreed upon formula. Second, the method may include transmitting a quantum system Q from the source device to the receiver device. The quantum system may be prepared in a randomly chosen state and may be measured by the receiver device in a randomly chosen measurement basis. These actions provide a degree of assurance that the measurement result is perfectly corrected with the preparation state only when the proper basis is chosen. In other words, the timing signal T may be authenticated through the following: 1) the receipt of quantum system Q at the expected time relative to T; and 2) verification that the quantum properties of quantum system Q have not been altered.

In one embodiment, the method includes of distributing time information from a source device to a receiver device over a quantum channel. The source device may be operably coupled to an external clock source. The method includes sending a photon pulse according to a time characteristic of the external clock source over the quantum channel from the source device to the receiver device, and communicating a time of transmission of the photon pulse from the source device to the receiver device over a communication channel. In the receiver device, an arrival time of one or more photons of the photon pulse may be detected, and one or more photons of the photon pulse may be returned to the source device via the quantum channel. The method may include determining a receiver synchronized clock based on a time of flight of the photon pulse sent by the source device, the arrival time of the one or more photons detected in the receiver device, and the time of transmission of the photon pulse communicated from the source device to the receiver device.

A time distribution system according to one embodiment may include a quantum channel, a communication channel, a source device and a receiver device. The quantum channel may be configured to transfer photons between a source device and a receiver device. The communication channel may be configured to facilitate communication between the source device and the receiver device. The source device may be operably coupled to an external clock source, and configured to transmit a photon pulse over the quantum channel according to a time characteristic of the external clock source. The source device may communicate a time of transmission of the photon pulse to the receiver device via the communication channel.

The receiver device may include a receiver device clock, and be configured to detect an arrival time of one or more photons of the photon pulse and to return one or more photons of the photon pulse to the source device via the quantum channel. The receiver device may determine a receiver synchronized clock that is synchronized to the external clock source based on a time of flight of the photon pulse sent by the source device, the arrival time of the one or more photons detected in the receiver device, and the time of transmission of the photon pulse communicated from the source device to the receiver device.

In one embodiment, a device comprising a quantum channel interface and a communication channel interface is provided. The quantum channel interface may be configured to receive and transmit quantum systems with respect to a source device, wherein the source device is operably coupled to a trusted clock source. The communication channel may be configured to communicate information with the source device. The device may include a quantum measurement device (e.g., a photon detector) configured to detect an arrival of a quantum system.

The device may include a controller operably coupled to the quantum measurement device and the communication channel, and configured to receive time of transmission information for the quantum system via the communication channel, said controller configured to store an arrival time of the quantum system detected by quantum measurement device, said controller configured to determine a clock output synchronized to the trusted clock source, wherein the clock output is determined based on a time of flight of the quantum system sent by the source device, the arrival time of the quantum system detected by the photon detector, and the time of transmission information of the quantum system received from the source device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
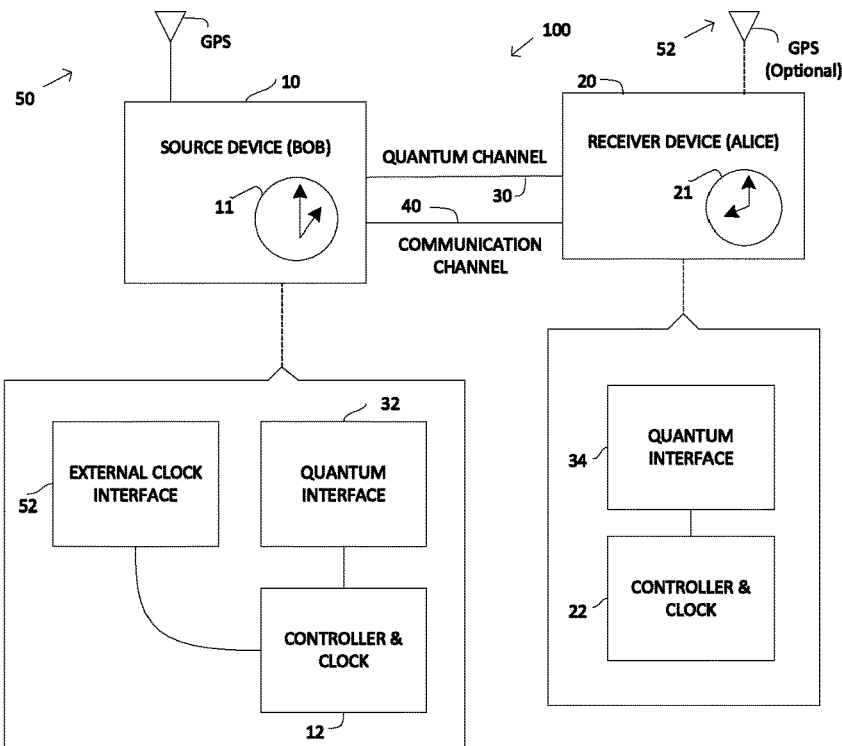
FIG. 1 shows a time distribution system according to one embodiment.

A time distribution system according to one embodiment of the present disclosure is shown in FIG. 1 and generally designated 100. The time distribution system 100 may include a source device 10 and a receiver device 20. The source device 10 and receiver device 20 may be disposed at separate locations, possibly separated by large distances (e.g., greater than 10 km). The source device 10 and the receiver device 20 may be operably coupled to each other via a quantum channel 30 and a communication channel 40. The communication channel 40 may be a classical channel (e.g., enabling transmission of 0s and 1s), and may separate from the quantum channel 30, such as a classical network communication channel over Ethernet. Alternatively, the communication channel 40 may be established through the quantum channel 30. Both the source device 10 and the receiver device 20 may respectively include a source device quantum interface 32 and a receiver device quantum interface 34. The nomenclature for the source device 10 and the receiver device 20 includes describing the source device 10 as Bob and the receiver device 20 as Alice. A third device named Eve is described as a potentially malicious device that attempts to penetrate or attack the integrity of the system.

According to one embodiment of the present disclosure, the time distribution system 100 may provide a provably secure time distribution method in which timing information is carried in the arrival times of single photons. This approach substantially ensures that any tampering activities will be revealed in detectable changes to the quantum states of the photons.

The source device 10 may be communicatively coupled to an external clock source 50, such as a global positioning system (GPS). An external clock interface 52 may facilitate communication with the external clock source 50. A source device clock 11 of the source device 10 may be synchronized to the external clock source 50 to provide precision timing capabilities to the source device 10. The external clock interface 52 may be configured to generate an external clock pulse at an interval associated with a time characteristic of the external clock source 50. For instance, the pulse may be generated once per second in unison with each one second tick of the external clock source 50. This type of pulse may be described as a 1 PPS (one-pulse-per-second) output.

The source device 10 may include a controller 12 operably coupled to the external clock interface 52, the sourced device clock 11, the communication channel 40, and the source device quantum interface 32. One or more of these components may be integrated into the controller 12. Additionally or alternatively, one or more aspects of the controller 12 described herein may be implemented separately from the controller 12. The controller 12 may include one or more of a processor, memory, an input interface and an output interface. In one embodiment, the controller 12 may be a field programmable gate array (FPGA), or an application specific integrated circuit (ASIC). The controller 12 may receive the 1 PPS from the external clock interface 52 and command the source device quantum interface 32 to generate the photon pulse. Delays due to software and/or hardware in the controller 12 and other aspects of the time distribution system 100 may be determined dynamically or at manufacture in order to facilitate synchronization with the external clock source 50.

The receiver device 20 may include a controller 22 similar to the controller 12 but with several exceptions. In one embodiment, the controller 22 is not in communication with the external clock source 50, and achieves clock synchronization with the external clock source via quantum channel 30 and communication channel 40. Optionally, the controller 22 may be coupled to an external clock source 52 (as shown in broken lines) but does not trust the external clock source. Communication with the source device 10 via the quantum channel 30 and communication channel 40 enable the receiver device 20 to confirm whether to trust the external clock source in this optional configuration.

The time distribution system 100 in the illustrated embodiment may enable the source device 10 in communication with the external clock source 50 to distribute the time of the external clock source 50 over large distances in a verifiable manner. The receiver device 20 in the illustrated embodiment includes a receiver device clock 21 that can be synchronized with the external clock source 50 via the quantum channel 30. This way, the receiver device clock 21 may provide precision timing capabilities to the receiver device 20 without utilizing a direct interface to the external clock source 50.

In the illustrated embodiment, the source device quantum interface 32 is configured to transmit a photon pulse according to the external clock pulse of the external clock interface 52. The photon pulse may include a plurality of photons that are phase modulated randomly from a phase set of $\{0, \pi, \pi/2, 3\pi/2\}$. This phase set is based on the BB84 protocol for quantum key distribution—it should be understood, however, that the phase set and/or protocol may be different. The photon pulse with a group of photons may also be described as a "frame". Each frame may include hundreds of photons whose phase is changed randomly from among the phase set.

The photon pulse may be frequency modulated between at least two modulation frequencies to indicate a transition between intervals of the external clock pulse. For example, the photon pulse may be modulated between 0.5 kHz and 1 kHz to indicate one second ticks according to the 1 PPS generated from the external clock interface. The photons, themselves, may be generated at a frequency other than the at least two modulation frequencies, including, for example, 5 MHz. The source device 10 may communicate a time of transmission (TOT) for the photon pulse to the receiver device 20 using the communication channel 40.

The photons of the photon pulse may function as direct carriers of timing information. Additionally, the techniques for quantum distribution of information, described herein, can be incorporated into the system to provide a degree of security along with the timing resolution provided by the timing information carried by the photons of the photon pulse. In other words, the timing information may be carried in the photons' arrival times, while the specific quantum states may be used to verify the integrity of the transmission link. For these and other reasons, this configuration can be described as quantum time distribution (QTD). The quantum bit error rate (QBER) with respect to the photon pulse and the weak signal may be monitored to determine the integrity of the quantum channel 30.

The receiver device 20 may detect one or more photons of the photon pulse, and log a time of arrival (TOA) with respect to the detected photons. The controller 22 of the receiver device 10 may be capable of registering a photon arrival from a detector against a fast internally gated clock, such as a clock in an FPGA with picosecond resolution.

The photon pulse may be attenuated to a weak signal that is a weak coherent state approximation of a single photon. In other words, attenuation of laser pulses or the photon pulses may be utilized to approximate a single photon scheme. The weak signal may be sent (e.g., reflected) back to the source device 10 via the quantum channel 30. One or more photons of the weak signal may be phase modulated according to the phase set utilized by the source device 10. The weak signal may be detected by a photon detector of the source device 10. The time of return (TOR) of the one or more photons in the weak signal may be logged, and used as a basis to calculate a one-way time of flight (TOF) for the photon pulse. As an example, the total distance of travel for the photons returned in the weak signal is substantially twice the one-way distance to the receiver device 20. Accordingly, the one-way time of flight may be calculated as half the difference between the TOR and TOT. The TOR and/or the TOT may be communicated via the communication channel 40 to the receiver device 20 so that a compensation metric can be calculated with respect to the receiver device clock 21.

The source device 10 may synchronize each of the photon pulses and the measured line length or TOF, and apply phase modulation and gate single photon detectors to align with the returning photon with respect to each photon pulse. This enables the source device 10 to match frames and pulses of the weak signal. The frames and the pulses of the weak signal may be matched with a high degree of resolution, such as within a nanosecond. With the frames and pulses being matched, the source device 10 may determine when to apply phase modulations and when to gate the photon detectors. The receiver device 20 in this context may synchronize to the incoming photon pulses or frames from the source device 10.

In one embodiment, the TOA registered in the receiver device 10 may be communicated to the source device via the communication channel 40. The source device 10 may be in communication with the external clock source 50 (e.g., a GPS receiver measured with a high speed FPGA). The time difference between the TOA and the external clock source 50 may be communicated over the communication channel 40, and used to monitor and/or adjust the clock 21 of the receiver device 20.

It should be noted that although the present disclosure focuses generally on distribution of time information from one device to another, the present disclosure is not so limited. The time distribution system 100 may enable multiplexed time distribution, for example to enable a single trusted clock to distribute time to multiple nodes on an electrical grid. Multiplexed operation can be achieved by applying accessible QKD for cost-effective secret sharing (AQCESS), whereby quantum nodes are added to an existing quantum communications system. Here, additional nodes (C1, C2 . . . Cn) placed in-line on the quantum channel perform their own phase shifts to the propagating photon. In such a way, time can be distributed securely between the master clock/node and any client on the network. Further examples of a multiplexed system, such as an AQCESS system, are described in U.S. Pat. No. 8,964,989, entitled METHOD FOR ADDING NODES TO A QUANTUM KEY DISTRIBUTION SYSTEM, issued Feb. 24, 2015, to Grice—the disclosure of which is hereby incorporated by reference in its entirety.

The compensation metric may be calculated as the TOA of the photon pulse (logged against the receiver device clock 21) offset by the difference between the TOA and the TOT (in sync with the external clock source) and further offset by the TOF. Put differently, the logged TOA may be ahead or behind the external clock source. By comparing the TOA measured by the receiver device 10 against the TOT synced to the external clock source 50, and adjusting for the TOF for the photon pulse, the time difference between the receiver device clock 21 and the external clock source 50 can be determined with high precision (e.g., on the order of nanoseconds, preferably picoseconds). The time difference may be utilized to adjust the receiver clock 21 ahead or back depending on whether the receiver device clock 21 leads or lags the external clock source 50.

In the illustrated embodiment, the quantum channel facilitates high precision time distribution with respect to the external clock source 50. Each external clock pulse generated at an interval associated with the external clock source 50 may generate a photon pulse, for which the system may determine to adjust the receiver device clock 21 forward or backward to align with the external clock source 50. For instance, the 1 PPS signal used to gate the photon pulses may enable the receiver device 20 to synchronize with the external clock source 50 every second. The frequency modulation of the photon pulses may facilitate associating each photon pulse with the TOT communicated via the communication channel 40 to the receiver device 20.

The time distribution system 100 according to one embodiment facilitates synchronizing one or more remote clocks with an external clock source 50. In some instances, a malicious device, such as Eve, may attempt to compromise the quantum channel integrity or adversely affect synchronization of the one or more remote clocks to the external clock source 50. The time distribution system 100 may provide quantum verification to enable verification of the channel integrity. This quantum verification may detect malicious activity on the quantum channel. For example, quantum verification may be utilized to detect a man-in-the-middle (MITM) attack on the quantum channel. The use of single photons in the weak signal may substantially ensure that any eavesdropping attempts introduce errors that can be detected by the source device 10.

In the illustrated embodiment, Eve may be disposed with access to the quantum channel between the source device 10 and the receiver device 20. Eve may attempt to skew synchronization by blocking the photon pulse from the source device 10, and sending a delayed version of the photon pulse. The time distribution system 100 may detect this type of attack primarily because there is asymmetry between the strength of the photon pulse and the strength of the weak signal. Eve's attempt to block the photon pulse, in order to spoof it, is likely to involve significant suppression of activity on the quantum channel 30. As a result, the weak signal is unlikely to be detected by the source device 10. Alternatively, if Eve reduces suppression efforts to allow the weak signal to return over the quantum channel 30, the photon pulse from the source device 10, separate from Eve's spoofed version of the photon pulse, is likely to be received by the receiver device 20. Interference caused by receipt of the photon pulse from the source device 10 and the spoofed version from Eve may be detected and identified as an integrity attack.

It should be understood that the time distribution system 100 may be implemented across many types of technology realms, including government, industrial, and military systems. An example realm is the electric grid in which there have been increased levels of automation and efforts to improve the reliability of the power system with existing infrastructure (e.g., existing distribution centers or power sub-stations). Control and protection functions of the electric grid may be dependent on data that is synchronized over a large geographic area, including between a first system and a second system located a generally large distance from the first system. One conventional method of synchronization between the first system and the second system includes use of GPS signals received in each system. The first system and the second system may rely on synchronization with the GPS signals with resolution to 1 millisecond or less. However, as discussed herein, the first and second system have no control over the GPS, and the GPS is potentially vulnerable to spoofing or denial of service attacks.

The first and second systems may include one or more control components for facilitating accurate management of the electric load, generation of power, and delivery of power. One such control component may utilize state estimation by monitoring one or more parameters of the electrical grid over a wide area. An example of such a component is a phase measurement unit (PMU), which can deliver substantially accurate snapshots of the grid state at high temporal resolution, providing information to operators for effective management of the grid. The information may be utilized to assist in voltage regulation and power flow control. In one embodiment, the PMU may incorporate one or more aspects of the source device 10 and/or the receiver device 20 described herein to facilitate high temporal resolution with respect to measurements obtained from the electrical grid. A PMU incorporating the receiver device 20 in accordance with one embodiment may avoid use of a GPS signal for time information, or may confirm whether time information from a GPS signal is trustworthy.

In one embodiment, the PMU may include capabilities to communicate, control and archive meter data with reliance on a GPS receiver. A PMU, such as the one available from Schweitzer Engineering Laboratories (SEL) and the SEL synchrowave software may be modified to utilize the timing distribution system 100 according to an embodiment described herein. This may avoid each PMU relying only on its own GPS receiver for timing information. The time distribution system 100 may enable a PMU in this framework to utilize timing information from another PMU, or to confirm validity of the clock output from the GPS receiver of the PMU, or a combination thereof.

With the time distribution system 100 utilized by the first and second systems, precision timing information may be provided to geographically separate locations in a way that reveals tampering attempts. Electrical delivery in dense urban environments with closely spaced substations (e.g., less than 40 miles apart) and optical fiber availability may be retrofitted with the time distribution system 100.

Figure 2:
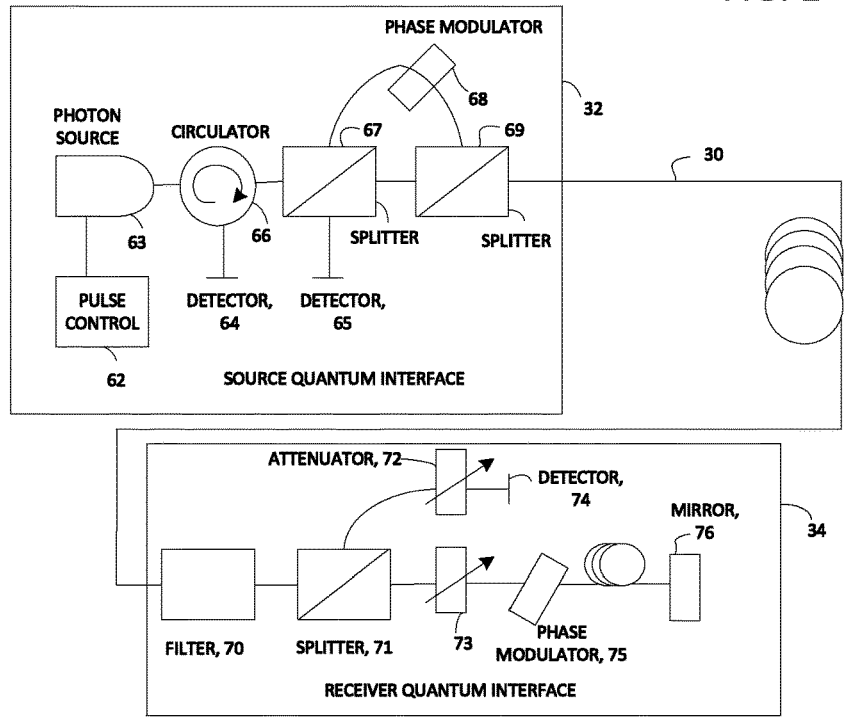
FIG. 2 shows a quantum interface of FIG. 1.

Turning to the illustrated embodiment of FIG. 2, the quantum channel 30, source device quantum interface 32, and receiver device quantum interface 34 are shown in further detail. The quantum channel 30 may be implemented as a fiber optic that enables transmission of single photons. It should be understood that the quantum channel is not limited to fiber optic and may be implemented in any type of channel that can transmit quantum information (e.g., the state of a qubit). The communication channel 40 shown in the illustrated embodiment of FIG. 1 as being separate from the quantum channel 30, but it should be understood that the communication channel 40 may utilize the same physical medium of transfer as the quantum channel 30 (e.g., the communication channel and the quantum channel may be implemented on the same fiber optic).

The source device quantum interface 32 and receiver device quantum interface may form an auto compensating optical platform that provides stability with respect to thermal drift and vibration. The source device quantum interface 32 may include one or more of the following: a photon source 63, a circulator 66, a first photon detector 64, a second photon detector 65, a beam splitter 67, a phase modulator 68, and a polarized beam splitter 69. The receiver quantum interface 34 may include one or more of the following: a bandpass filter 70, a beam splitter 71, a first optical attenuator 72, a second optical attenuator 73, a detector 74, a phase modulator 75, and a faraday mirror 76. An example quantum interface with an auto compensating optical platform used in the realm of quantum key distribution (QKD) is the Clavis2 system available from ID Quantique. This system for quantum key distribution is described in further detail in U.S. Pat. No. 6,438,234, entitled QUANTUM CRYPTOGRAPHY DEVICE AND METHOD, issued Aug. 20, 2002, and *Quantum Key Distribution over 67 km with a plug & play system*, D. Stucki et al., submitted Mar. 22, 2002—the disclosures of which are incorporated herein by reference in their entirety.

The photon source 63 may be configured to generate a train of bright light pulses (e.g., photon pulses) sent over the quantum channel 30, which in this case is a fiber link (e.g., single mode fiber) between the source device 10 and the receiver device 20. Upon arrival at the receiver device 20, the incoming photon pulse train may trigger the photon detector 74. The time of arrival (TOA) of the photon pulse train may be used as a basis for synchronizing the receiver device clock 21 to the external clock source 50 and/or the source device clock 11.

The receiver device 20 may attenuate the photon pulse train using the attenuator 73, and reflect the attenuated photon pulse—now a weak signal or weak coherent state approximation of a single photon—back to the source device 10 along the same optical fiber used to transmit the photon pulse train to the receiver device 20. The receiver quantum interface 34 may apply one of four possible phase shifts (e.g., from the phase set described herein) that are chosen at random to the pulse train before sending it back along the same optical fiber to the source device 10.

In the illustrated embodiment, the generally high intensity or bright photon pulses generated by the source quantum interface 32 may be highly attenuated by the attenuator 75 of the receiver quantum interface 34 so that they can be approximated as single photons. This configuration may provide sensitivity to attempts at eavesdropping or tampering. The single photons returning to the source quantum interface 32 may be phase shifted by the source quantum interface 32 according to one of two possible phase shifts applied at random. The single photons may be detected by one of two single-photon avalanche detectors 65, 65. Over the communication channel 40, which may be a public communication channel (e.g., the internet), the source device 10 and the receiver device 20 may exchange partial information about the phase shift values, and then use this information to verify integrity of the quantum channel 30. Errors in the process may indicate the potential presence of eavesdropping or tampering on the quantum channel 30. In other words, the quantum bit error rate (QBER) may be monitored to determine integrity of the quantum channel 30.

The round trip delay or time of flight (TOF) may be measured with the source quantum interface 32 and receiver quantum interface 34 with high accuracy and precision, such as within 20 picoseconds. This may enable high precision clock synchronization between two (or more) distant devices.

In the illustrated embodiment, the source device quantum interface 32 includes a pulse controller 62 configured to control operation of the photon source 63. According to one embodiment of the present disclosure, the photon source 63 may be frequency modulated between two frequencies corresponding to ticks of a 1 PPS. Each tick is associated with one of the two frequencies, where the frequency for each tick is different from that of the prior tick. In this way, the photon source 63 alternates between the two frequencies according to the 1 PPS. The first frequency may be 1000 Hz, and the second frequency may be 500 Hz. The photons output from the photon source 63 may be approximately 5 MHz. The receiver device 20 may detect early or late arrival of the photon pulse (or frame), and trigger a 1 PPS in the receiver device 20 accordingly to achieve synchronization with the 1 PPS of the source device 10.

The delay times are either substantially constant (e.g., hardware or electronic delays) or measureable (e.g., TOF). The source device 10 and the receiver device 20 may compensate for such delay times in software and resynchronize the clocks 11, 21 based on the photon pulse and weak signal communicated over the quantum channel 30. This may prevent stead walk off of two similar but different clocks such as a clock of an FPGA or walk off due to a GPS spoofing attack. The clocks 11, 21 may be synchronized to the external clock source 50 or to each other, with one of the devices being the master clock.

As discussed herein, the photon pulses from the source quantum interface 32 may be emitted at one of two frequencies (e.g., 500 Hz and 1000 Hz). Each photon pulse or frame may include many photons at another frequency, such as 5 Mhz. The receiver quantum interface 34 may gate the detector 74 at a frame rate of 1000 Hz and the same number of photons and MHz frequency within each frame. The 1 Hz signal may encode time information that can be processed by the receiver device 20. The frequency of the photon pulses (e.g., 500 Hz and 1000 Hz) in the illustrated embodiment may be described as the photon frame frequencies, rather than the photon frequency or frequency of the photons themselves. The actual photon frequency may be much higher, such as approximately $1 \times 10^{15}$ Hz.

In conjunction with each frame that is sent from the source quantum interface 32, the source device 10 may publicly announce the TOT for the frame. The receiver device 20 may use the TOT information along with the TOF to determine when the frame should have arrived. A comparison of the predicted TOA (based on TOT and TOF) to the actual TOA for the frame maybe conducted to determine a compensation metric for the receiver device clock 21.

The source quantum interface 32 and receiver quantum interface 34 may enable synchronization of a clock, such as the external clock source 50, at one location with a master clock at a second, remote location (e.g., the receiver device clock 21). The timing signal can be transmitted across an optical link type of the quantum channel 30 in the form of a photon pulse, and single photons returned from the receiver quantum interface 34 may be used to verify integrity of the link.

In one embodiment, the latency of the quantum channel 30 or the TOF may be established by measuring the total time for a short optical pulse to travel from the source device 10 to the receiver device 20 and then back along the quantum channel 30. With this round trip time established, the source device 10 and/or the receiver device 20 may be capable of synchronizing with the other via transmission and receipt of an optical pulse. The master clock or the clock against another device is to be synchronized may reside or be provided to either the source device 10 or the receiver device 20. Because the actions of the source device 10 and the receiver device 20 may be optically synchronized, synchronization in either device may be achieved by a local measurement of the time difference between the master clock and the local clock at either device. This time difference can be broadcast to the other device via the communication channel 30, enabling both the source device 10 and the receiver device 20 to reference the master clock.

To substantially avoid, detect, or prevent efforts to skew synchronization or affect the integrity of the quantum channel 30, single photons may be communicated back across the quantum channel 30, and phase shifts may be applied for quantum verification. Short optical pulses or the photon pulse as described herein may be attenuated to the single photon level. The source device 10 and the receiver device 20 may apply phase shifts respectively to the photon pulse and the weak signal (or single photon approximation). Efforts by Eve to monitor or affect the quantum channel 30 may be visible to one or both of the source device 10 and the receiver device 20 in improper or unexpected changes to the phase of the photons in the photon pulse and/or weak signal. This way channel integrity can be substantially verified. Additionally, or alternatively, quantum verification may generate a random sequence of bits shared between the source device 10 and the receiver device 20. This random sequence of bits may form a shared key that can be used for additional encryption or authentication tasks.

In one embodiment, the source quantum interface 32 and the receiver quantum interface 34 may use detection events in each frame for the BB84 quantum key distribution algorithm and an error correction algorithm to determine QBER. If the photons arrived at the correct time and the QBER is low, the receiver device 20 can proceed with a high degree of confidence that the source device 10 is the source of the timing information.

As discussed herein, the frames detected at the receiver device 20 may be phase modulated and returned as single photons to the source device 10. The source device 10 and the receiver device 20 may conduct a BB84 algorithm and an error correction algorithm, such as a recursive parity checking algorithm known as a cascade algorithm. The source device 10 and the receiver device 20 may determine the QBER, which provides a measure of whether or not quantum channel 30 or the frames have been tampered with. The QBER by itself may not be entirely sufficient for security as the losses in the system mean that the source device will only detect a few bits per frame. To offset the effect of the losses, the receiver device 30 may log the TOA for each frame on the receiver device clock 21. Because the source device 10 knows the round trip line length and the TOT for a frame, the source device 10 can confirm that a frame was not shifted in time by an adversary.

A method of distributing time information to enable synchronization in an authenticated manner is provided according to one embodiment. The method may include two primary steps. First, a source device may transmit a timing signal, T on a communication channel 40 from the source device 10 to the receiver device 20. The timing signal T may be include a time or times stored in memory or calculated using a previously agreed upon formula. Second, the method may include transmitting a quantum system Q from the source device 10 to the receiver device 20. The quantum system may be prepared in a randomly chosen state and may be measured by the receiver device 20 in a randomly chosen measurement basis. These actions provide a degree of assurance that the measurement result is perfectly corrected with the preparation state only when the proper basis is chosen. In other words, the timing signal T may be authenticated through the following: 1) the receipt of quantum system Q at the expected time relative to T; and 2) verification that the quantum properties of quantum system Q have not been altered.

In one embodiment, the source device 10 is Alice and the receiver device 20 is Bob. Each party A, B can send or receive the timing signal T and the quantum system Q. For instance, one party may send both the timing signal T and the quantum system Q to the other party. As another example, one party may send the timing signal T and receive the quantum system Q.

For purposes of disclosure, the following example is described in connection with Alice sending both the timing signal T and the quantum system Q. Prior to synchronization, Alice and Bob measure or calculate latencies with respect to the communication channel 40 and the quantum channel 30. The latency of the communication channel 40 is identified as L_T, and the latency of the quantum channel 40 is identified as L_Q With this information obtained, synchronization may proceed as follows. Alice may send the quantum system Q and the timing signal T at respective times of transmission Q and T or TOT-Q and TOT-T. These respective times, TOT-Q and TOT-T, may be announced publicly. Bob may subsequently receive the quantum system Q and the timing signal T at respective times of arrival or TOA-Q and TOA-T.

At this stage, Bob may confirm that the quantum system Q was received at the expected time, relative to the timing signal T. This may be performed according to the following formula: $(TOA\text{-}Q-TOA\text{-}T)-(TOT\text{-}Q-TOT\text{-}T)=L\_Q-L\_T$.

Bob may conduct a measurement of the quantum system Q and announce the measurement basis to Alice. If Bob measured in the same basis that Alice used to prepare the quantum system Q, then Alice announces the prepared state of the quantum system Q. B may compare the prepared state of the quantum system Q with the measured state of the quantum system Q. If the comparison indicates the prepared state and the measured state are substantially the same, then Bob may conclude that the quantum system Q received is the same as the quantum system sent. In other words, Alice and Bob may conduct this sequence for many quantum systems (e.g., a stream of photons), and may compile statistics pertaining to the correlation between the prepared and measured states. The error rate may establish an upper bound on the degree to which an adversary might have tampered with the quantum system Q.

Figure 3:
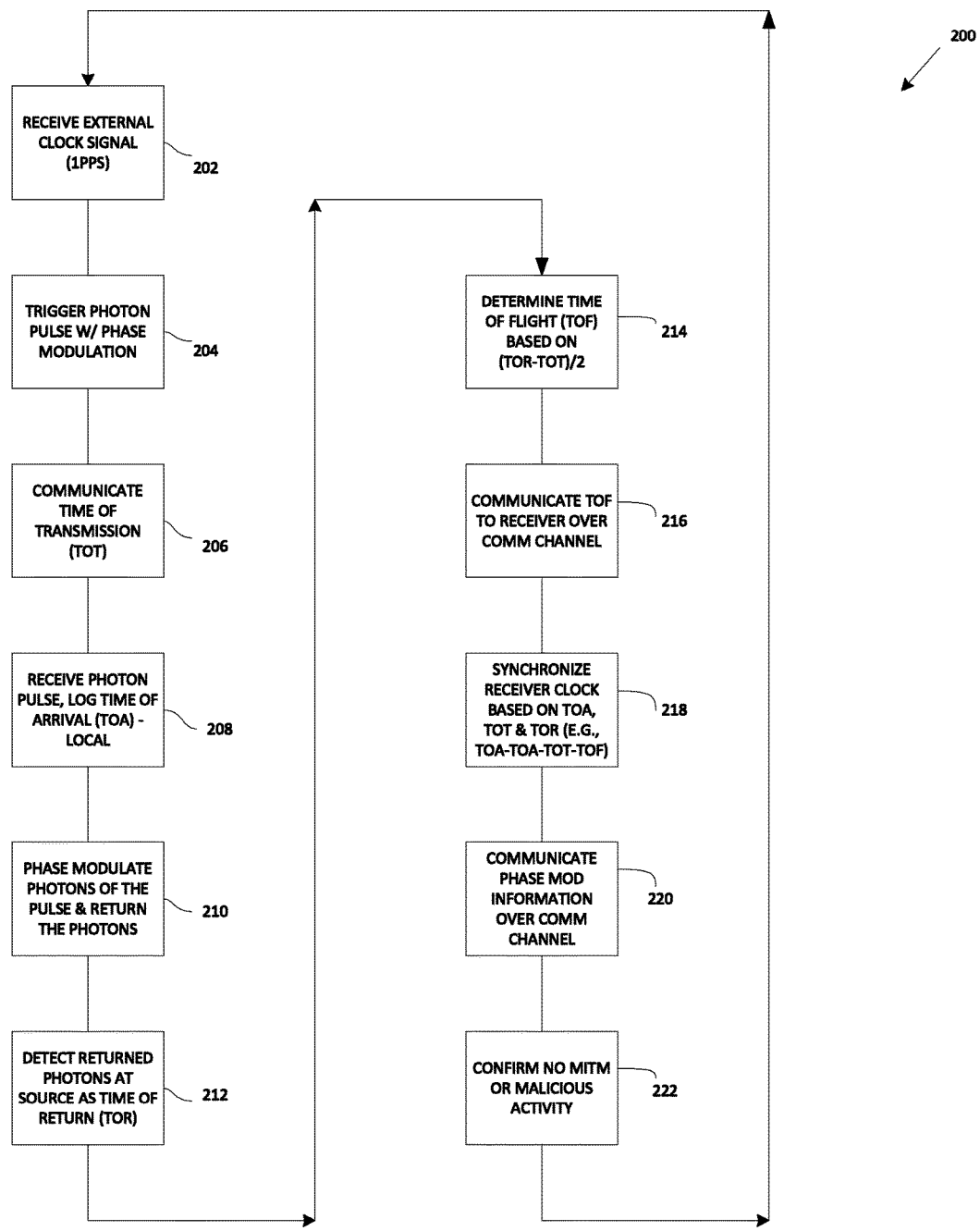
FIG. 3 depicts a method of distributing time according to one embodiment.

A method of distributing time according to one embodiment of the present disclosure is shown in FIG. 3 and generally designated 200. The method includes receiving an external clock signal, such as a 1 PPS. Step 202. The controller 12 may trigger the pulse controller 62 of the quantum source device quantum interface 32 to generate a photon pulse with phase modulation. Step 204. The phase modulation may affect the phase of the photons in the photon to a phase of the phase set. The controller 12 may communicate the time of transmission (TOT) via the classical channel or communication channel 40 to the receiver device 20. Step 206. This TOT may be stored in memory of the controller 22 of the receiver device 40. The controller 12 may also communicate information relating to the phase modulation applied to the photons in the photon pulse.

The receiver device 20 may receive the photon pulse and log the time of arrival (TOA) based on the clock 21 of the receiver device 20. Step 208. The controller 22 of the receiver device 20 may phase modulate one or more photons of the photon pulse and return the one or more photons to the source device 10 via the quantum channel 30. The one or more photons returned to the source device 10 may form part of a weak signal that is the weak coherent state approximation of a single photon from the photon pulse. This weak signal may be generated from an attenuator, such as the attenuator 73 of the receiver device quantum interface 34. The controller 22 may communicate, via the communication channel 40, information to the source device 10 that relates to the phase modulation applied to the weak signal. The source device 10 and/or the receiver device 20 may compare the information relating to the phase modulation of the photon pulse and the weak signal to determine integrity of the quantum channel and whether Eve has attempted an attack. Steps 220, 222.

The source device 10 may determine the time of flight (TOF) for photons of the photon pulse based on the time of return (TOR) and the time of transmission (TOT). Step 214. Because the time of flight depends on physical parameters of the time distribution system 100, the time of flight may not vary significantly over time. As a result, the time of flight for a photon pulse may be reused for one or more subsequent pulses. For instance, the time of flight may be determined initially and used for each subsequent photon pulse. Another example includes determining the time of flight at an interval (e.g., every hour, or ever 1000 pulses) or in response to a condition or event.

The source device 10 may communicate the time of flight information to the receiver device 20 via the communication channel 40. Step 216. The receiver device 20 may utilize the time of flight information, the time of arrival information, and the time of transmission information to generate a compensation metric for the receiver clock 21 to synchronize with the 1 PPS generated from the external clock source 50 communicatively coupled to the source device 10. Step 218. Additionally, or alternatively, the controller 22 of the receiver device 20 may determine whether an untrusted clock in communication with the controller 22 is accurate or substantially synchronized to the trusted, external clock source 50 coupled to the source device 10. The controller 22 may optionally be coupled directly to an untrusted clock signal 52, as shown in FIG. 1, and compare the trusted external clock source 50 to the untrusted clock signal 52 to determine whether the untrusted clock signal 52 can be trusted with a degree of confidence. In one embodiment, the receiver device 20 may generate a detection signal to another device in response to the 1 PPS signal synched with the external clock source 50 that is coupled to the source device 10. The detection signal may be compared against the untrusted clock signal 52 to determine whether the untrusted clock signal 52 is accurate.

Experimentally, a spoofed, untrusted clock signal 52 has been provided to the receiver device 20, and compared against the detection signal generated with the time distribution system 100 as described herein. The detected delay of the untrusted clock signal 52 relative to the trusted external clock source 50, coupled to the source device 10, was determined to be substantially equal to the delay introduced into the spoofed, untrusted clock signal. The untrusted clock signal 52 and the external clock source 50 in this experiment were GPS signals. The untrusted clock signal 52 was coupled to a variable electronic time delay so that different conditions could be tested. The time distribution system was able to detect a slow walk off of the spoofed GPS signal on the side of the receiver device 20 in comparison with the QTD synchronized signal over 12 km of dark single mode fiber with multiple splices and fiber connectors.

The process may continue with transmission of photon pulses from the source device in accordance with the 1 PPS from the external clock source 50, or another time characteristic of the external clock source 50 (e.g., every 10 seconds). In this way, the receiver device 20 may synchronize the receiver clock 21 to the trusted, external clock 50 or authenticate the output of an untrusted clock. Synchronization and/or authentication may be conducted periodically, or in response to an event or condition being satisfied.

Figure 4:
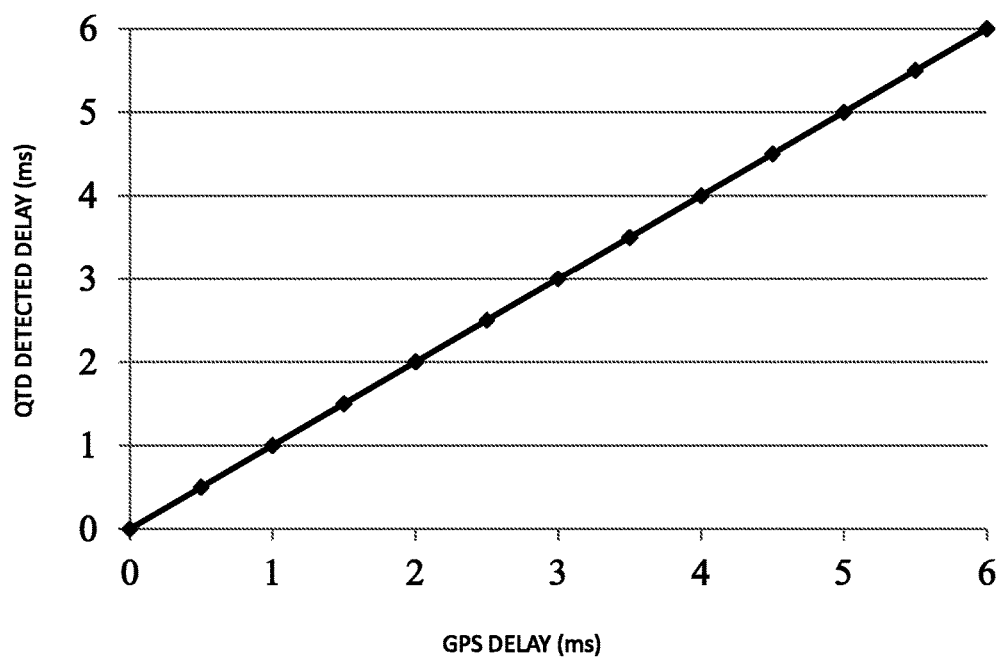
FIG. 4 shows experimental data for a time distribution system according to one embodiment.

The illustrated embodiment of FIG. 4 shows the amount of delay added to a GPS signal to generate an untrusted local GPS (corresponding to the untrusted clock source 52) vs. the amount of difference between a) a synchronized clock 21 in the receiver device 20 in accordance with an embodiment the time distribution system 100 and b) the actual GPS signal. As the spoofing takes place the GPS signal can be seen to walk off from the synchronized clock 21. The slope of 1 for this data at a millisecond scale indicates the accuracy of the synchronized clock 21.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of distributing time information from a source device to a receiver device over a quantum channel, the source device operably coupled to an external clock source, said method comprising:
   sending a photon pulse according to a time characteristic of the external clock source over the quantum channel from the source device to the receiver device;
   communicating a time of transmission of the photon pulse from the source device to the receiver device over a communication channel;
   detecting, in the receiver device, an arrival time of one or more photons of the photon pulse;
   returning one or more photons of the photon pulse to the source device via the quantum channel; and
   determining a receiver synchronized clock based on a time of flight of the photon pulse sent by the source device, the arrival time of the one or more photons detected in the receiver device, and the time of transmission of the photon pulse communicated from the source device to the receiver device.

2. The method of claim 1 comprising:
   changing a phase of a plurality of photons of the photon pulse;
   attenuating each photon pulse received in the receiver device to a weak signal with one or more returning photons to be returned to the source device via the quantum channel, wherein a phase of one or more returning photons is changed; and
   wherein said returning one or more photons comprises sending the weak signal over the quantum channel from the receiver device to the source device.

3. The method of claim 2 comprising:
   communicating, via the communication channel, source phase modulation information with respect to the phase of the plurality of photons of the photon pulse sent from the source device;
   communicating, via the communication channel, receiver phase modulation information with respect to the phase of the one or more returning photons; and
   verifying absence of malicious activity on the quantum channel based on the source phase modulation information and the receiver phase modulation information.

4. The method of claim 2 wherein the phase of each of the plurality of photons of the photon pulse is modulated randomly from the set of $\{0, \pi, \pi/2, 3\pi/2\}$, and wherein the phase of each of the one or more return photons is modulated randomly from the set of $\{0, \pi, \pi/2, 3\pi/2\}$.

5. The method of claim 1 comprising determining a time of flight based on the time of transmission of the photon pulse and a time of arrival in the source device of the one or more photons returned from the receiver device to the source device.

6. The method of claim 1 comprising sending the photon pulse at an interval according to the time characteristic of the external clock source.

7. The method of claim 6 wherein the interval is once per second, and wherein the receiver synchronized clock is re-synchronized to the external clock source once per second.

8. The method of claim 6 comprising frequency modulating photon pulses sent at the interval between a first frequency and a second frequency such that single photons are emitted in each photon pulse at one of the first or second frequencies, wherein the interval is encoded in the switching between the first and second frequencies.

9. The method of claim 8 wherein a frequency of the single photons of each photon pulse is a third frequency different from the first and second frequencies.

10. The method of claim 1 wherein the external clock source is a GPS signal, wherein the source device and receiver device are controllers on an electrical grid, comprising determining in the source device status information of the electrical grid relative to a time of the external clock source, comprising determining in the receiver device status information of the electrical grid relative to the time of the external clock source.

11. A time distribution system comprising:
    a quantum channel configured to transfer photons between a source device and a receiver device;
    a communication channel configured to facilitate communication between the source device and the receiver device;
    said source device operably coupled to an external clock source, said source device configured to transmit a photon pulse over the quantum channel according to a time characteristic of the external clock source, said source device configured to communicate a time of transmission of the photon pulse to the receiver device via the communication channel;
    said receiver device with a receiver device clock, said receiver configured to detect an arrival time of one or more photons of the photon pulse and to return one or more photons of the photon pulse to the source device via the quantum channel; and
    wherein said receiver device is configured to determine a receiver synchronized clock that is synchronized to the external clock source based on a time of flight of the photon pulse sent by the source device, the arrival time of the one or more photons detected in the receiver device, and the time of transmission of the photon pulse communicated from the source device to the receiver device.

12. The system of claim 11 wherein:
    said source device is configured to change a phase of a plurality of photons of the photon pulse;
    said receiver device is configured to attenuate each photon pulse received to generate a weak signal with one or more returning photons to be returned to the source device via the quantum channel, wherein a phase of the one or more returning photons is changed; and
    said receiver sends the weak signal to the source device via the quantum channel.

13. The system of claim 12 wherein source phase modulation information with respect to the phase of the plurality of photons of the photon pulse sent from the source device is communicated to the receiver device via the communication channel, and wherein receiver phase modulation information with respect to the phase of the one or more returning photons is communicated to the source device via the communication channel; and
    wherein at least one of the source device and the receiver device verifies absence of malicious activity on the quantum channel based on the source phase modulation information and the receiver phase modulation information.

14. The system of claim 12 wherein a time of flight is determined based on the time of transmission of the photon pulse and a time of arrival in the source device of the one or more returning photons of the weak signal sent to the source device.

15. The system of claim 12 wherein the source device is configured to send the photon pulse at an interface according to the time characteristic of the external clock source.

16. The system of claim 15 wherein the interval is once per second, and wherein the receiver synchronized clock is re-synchronized to the external clock source once per second.

17. The system of claim 15 wherein the frequency of the photon pulses sent at the interval is modulated between a first frequency and a second frequency such that single photons are emitted in each photon pulse at substantially one of the first or second frequencies, wherein the interval is encoded in the switching between the first and second frequencies.

18. The system of claim 17 wherein a frequency of the single photons of each photon pulse is a third frequency different from the first and second frequencies.

19. The system of claim 11 wherein the external clock source is a GPS signal and the source device is a controller on an electrical grid that determines status information relative to a time of the external clock source, and wherein the receiver device is another controller on the electrical grid separated geographically from the controller and configured to determine status information relative to the time of the external clock source.

20. A device comprising:
a quantum channel interface configured to receive and transmit photons with respect to a source device, wherein the source device is operably coupled to a trusted clock source, said quantum channel interface configured to attenuate photons received;
a communication channel configured to communicate information with the source device;
a photon detector configured to detect an arrival of one or more photons of a photon pulse received from the source device; and
a controller operably coupled to the photon detector and the communication channel, said controller configured to receive time of transmission information for the photon pulse via the communication channel, said controller configured to store an arrival time of the one or more photons detected by the photon detector, said controller configured to determine a clock output synchronized to the trusted clock source, wherein the clock output is determined based on a time of flight of the photon pulse sent by the source device, the arrival time of the one or more photons detected by the photon detector, and the time of transmission information of the photon pulse received from the source device.

* * * * *